(12) United States Patent
Chiang et al.

(10) Patent No.: US 9,710,125 B2
(45) Date of Patent: Jul. 18, 2017

(54) METHOD FOR GENERATING MULTIPLE WINDOWS FRAMES, ELECTRONIC DEVICE THEREOF, AND COMPUTER PROGRAM PRODUCT USING THE METHOD

(71) Applicant: HTC Corporation, Taoyuan County (TW)

(72) Inventors: Ching-Liang Chiang, Taoyuan County (TW); Chi-Pang Chiang, Taoyuan County (TW); Chih-Wei Tai, Taoyuan County (TW); Chao-Yi Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 458 days.

(21) Appl. No.: 14/040,740

(22) Filed: Sep. 30, 2013

(65) Prior Publication Data

US 2014/0109000 A1   Apr. 17, 2014

Related U.S. Application Data

(63) Continuation of application No. 12/469,689, filed on May 21, 2009, now Pat. No. 8,547,347, which is a continuation-in-part of application No. 12/239,529, filed on Sep. 26, 2008, now Pat. No. 8,600,446.

(30) Foreign Application Priority Data

Mar. 5, 2009   (TW) ................ 98107132 A (51) Int. Cl.
*G06F 3/0481* (2013.01)
*G06F 3/041* (2006.01)
(Continued)

(52) U.S. Cl.
CPC ............ *G06F 3/0481* (2013.01); *G06F 3/041* (2013.01); *G06F 3/0488* (2013.01);
(Continued)

(58) Field of Classification Search
CPC .... G06F 3/04883; G06F 3/0488; G06F 3/017; G06F 3/04886; G06F 2203/04803; G06F 3/0481; G06F 3/041
USPC ................................................. 715/788, 863
See application file for complete search history.

(56) References Cited

U.S. PATENT DOCUMENTS

| | | | | |
|---|---|---|---|---|
| 5,398,310 A | * | 3/1995 | Tchao ................ | G06F 3/04883 715/234 |
| 6,011,552 A | * | 1/2000 | Ramanathan ......... | G06F 3/0481 715/803 |

(Continued)

FOREIGN PATENT DOCUMENTS

TW           M325544        1/2008

OTHER PUBLICATIONS

"Office Action of Taiwan Counterpart Application", issued on Apr. 25, 2014, p. 1-p. 5.

*Primary Examiner* — Christopher J Fibbi
(74) *Attorney, Agent, or Firm* — Jianq Chyun IP Office (57) ABSTRACT

A method for generating multiple windows frames, an electronic device thereof, and a computer program product using the method are provided. In the present method, first, a touch trajectory generated by continuously touching a touch panel of the electronic device is detected, wherein the center of the touch panel is a display area, and a non-display area surrounds the display area. Then, whether the touch trajectory is started from one side of the non-display area and passed through the display area to be extended to another side of the non-display area is determined. If so, the display area is split according to the touch trajectory to display at least two windows frames. As a result, an intuitional and convenient method for generating multiple windows frames in the display area is provided, and the operation of the electronic device is made very convenient.

12 Claims, 4 Drawing Sheets

(51) Int. Cl.
*G06F 3/0488* (2013.01)
*G06F 3/01* (2006.01)
(52) U.S. Cl.
CPC ...... *G06F 3/04883* (2013.01); *G06F 3/04886* (2013.01); *G06F 3/017* (2013.01); *G06F 2203/04803* (2013.01)

(56) References Cited

U.S. PATENT DOCUMENTS

| | | | | |
|---|---|---|---|---|
| 6,310,631 B1 * | 10/2001 | Cecco | .................. | G06F 3/0481 |
| | | | | 715/792 |
| 7,676,767 B2 * | 3/2010 | Hofmeister | ........... | G06F 3/0483 |
| | | | | 345/173 |
| 8,701,049 B2 * | 4/2014 | Kim | .................. | G06F 3/04883 |
| | | | | 345/158 |
| 2003/0216861 A1 * | 11/2003 | Sakata | .................. | G01C 21/36 |
| | | | | 715/863 |
| 2005/0267676 A1 * | 12/2005 | Nezu | .................. | G06F 3/04883 |
| | | | | 701/532 |
| 2007/0222769 A1 * | 9/2007 | Otsuka | ............... | G01C 21/3664 |
| | | | | 345/173 |
| 2007/0250788 A1 * | 10/2007 | Rigolet | ................ | G06F 3/0481 |
| | | | | 715/788 |
| 2008/0094421 A1 * | 4/2008 | Maeda | ................ | G06F 3/0481 |
| | | | | 345/661 |
| 2010/0093399 A1 * | 4/2010 | Kim | .................. | H04M 1/0202 |
| | | | | 455/566 |

* cited by examiner

METHOD FOR GENERATING MULTIPLE WINDOWS FRAMES, ELECTRONIC DEVICE THEREOF, AND COMPUTER PROGRAM PRODUCT USING THE METHOD

CROSS-REFERENCE TO RELATED APPLICATION

This application is a continuation application and claims the priority benefit of an application Ser. No. 12/469,689 filed on May 21, 2009, now pending. The prior U.S. application Ser. No. 12/469,689 is a continuation-in-part of and claims the priority benefit of U.S. application Ser. No. 12/239,529, filed on Sep. 26, 2008. The prior U.S. application Ser. No. 12/469,689 also claims the priority benefit of Taiwan application serial no. 98107132, filed on Mar. 5, 2009. The entirety of each of the above-mentioned patent applications is hereby incorporated by reference herein and made a part of this specification.

BACKGROUND OF THE INVENTION

1. Field of the Invention

The present invention generally relates to a method for operating an electronic device with a touch panel, and more particularly, to a method for generating multiple windows frames in foregoing electronic device and applications related to the method.

2. Description of Related Art

Along with the development of mobile communication products, cell phones which can only be used for making phone calls have been gradually replaced by products integrated with more functions in order to meet the requirements of consumers. Among such products, personal digital assistant (PDA) phone integrated with address book, calendar, and different organizer application programs is one of the most favorable products to business people.

Generally speaking, besides being installed with various application programs to accomplish functions like record keeping, event reminding, text input, web browsing, and instant messaging, a PDA phone can also be synchronized with a computer system to update the data stored therein. For example, a PDA phone installed with an operating system developed by Microsoft Corp. can be synchronized with a computer system also installed with an operating system provided by Microsoft Corp., so that data (for example, emails or contacts) in the computer system can be transferred to the PDA phone.

However, as to most existing PDA phones, each time only a single windows frame can be displayed in the screen of a PDA phone. Namely, every time a user can only view the content of a single windows frame. If the user needs to view windows frames containing other related contents, the user has to switch between different windows frames but cannot view two or more windows frames at the same time. Obviously, it is very inconvenient to the user to repeatedly switch between different windows frames and compare the contents of different windows frames.

SUMMARY OF THE INVENTION

Accordingly, the present invention is directed to a method for generating multiple windows frames which allows a user to split a windows frame displayed in a screen into multiple windows frames through a simple touch action.

The present invention is also directed to an electronic device which can split a windows frame displayed in a touch panel thereof by detecting a touch trajectory produced on the touch panel.

The present invention is further directed to a computer program product suitable for being loaded into an electronic device, wherein an intuitional and convenient method for splitting a windows frame displayed in a screen is provided.

The present invention provides a method for generating multiple windows frames, and the method is suitable for an electronic device with a touch panel, wherein the center of the touch panel is a display area, and a non-display area surrounds the display area. In the present method, first, a touch trajectory generated by continuously touching the touch panel is detected. Then, whether the touch trajectory is started from one side of the non-display area and passed through the display area to be extended to the other side of the non-display area is determined. If the touch trajectory is started from one side of the non-display area and passed through the display area to be extended to the other side of the non-display area, the display area is split according to the touch trajectory to display at least two windows frames.

According to an embodiment of the present invention, after the step of detecting the touch trajectory, the method further includes determining whether the touch trajectory is started from an edge of the display area and passed through the display area to be extended to the other edge of the display area, and if the touch trajectory is started from an edge of the display area and passed through the display area to be extended to the other edge of the display area, splitting the display area according to the touch trajectory to display a plurality of windows frames.

According to an embodiment of the present invention, the touch trajectory includes a continuous straight trajectory or a continuous curve trajectory.

According to an embodiment of the present invention, the step of splitting the display area according to the touch trajectory to display the windows frames includes splitting the display area to display n+1 windows frames when n touch trajectories are simultaneously generated, wherein n is a positive integer.

According to an embodiment of the present invention, before the step of splitting the display area to display the windows frames, the display area is used for displaying a first operation windows frame of a first application program, and after the step of splitting the display area according to the touch trajectory to display the windows frames, the method includes displaying at least two of the first operation windows frame and a plurality of second operation windows frames related to the first application program in the split display area. According to another embodiment of the present invention, after the step of splitting the display area according to the touch trajectory to display the windows frames, the method includes displaying at least two of the first operation windows frame and a second operation windows frame of at least one second application program in the split display area.

According to an embodiment of the present invention, the step of splitting the display area according to the touch trajectory to display the windows frames includes directly displaying a tool list related to the first application program at an intersection between two of the windows frames.

According to an embodiment of the present invention, after the step of splitting the display area according to the touch trajectory to display the windows frames, the method further includes detecting a second touch trajectory and when the second touch trajectory overlaps an intersection between two of the windows frames, displaying a tool list related to the first application program at the intersection.

According to an embodiment of the present invention, the step of displaying the tool list includes moving the windows frames to display the tool list.

The present invention also provides an electronic device including a touch panel, a determination module, and a windows frame split and display module. The touch panel detects a touch trajectory generated by continuously touching the touch panel, wherein the center of the touch panel is a display area, and a non-display area surrounds the display area. The determination module coupled to the touch panel determines whether the touch trajectory is started from one side of the non-display area and passed through the display area to be extended to the other side of the non-display area. The windows frame split and display module coupled to the determination module and the touch panel splits the display area according to the touch trajectory to display at least two windows frames when the determination module determines that the touch trajectory is started from one side of the non-display area and passed through the display area to be extended to the other side of the non-display area.

According to an embodiment of the present invention, the determination module determines whether the touch trajectory is started from an edge of the display area and passed through the display area to be extended to the other edge of the display area. If the determination module determines that the touch trajectory is started from an edge of the display area and passed through the display area to be extended to the other edge of the display area, the windows frame split and display module splits the display area according to the touch trajectory to display a plurality of windows frames.

According to an embodiment of the present invention, the touch trajectory includes a continuous straight trajectory or a continuous curve trajectory.

According to an embodiment of the present invention, the windows frame split and display module splits the display area to display n+1 windows frames when n touch trajectories are simultaneously generated, wherein n is a positive integer.

According to an embodiment of the present invention, before the windows frame split and display module splits the display area to display the windows frames, the display area is used for displaying a first operation windows frame of a first application program, and the windows frame split and display module displays at least two of the first operation windows frame and a plurality of second operation windows frames related to the first application program in the split display area. According to another embodiment of the present invention, the windows frame split and display module displays at least two of the first operation windows frame and a second operation windows frame of at least one second application program in the split display area.

According to an embodiment of the present invention, the windows frame split and display module directly displays a tool list related to the first application program at an intersection between two of the windows frames.

According to an embodiment of the present invention, the touch panel detects a second touch trajectory, and when the second touch trajectory overlaps an intersection between two of the windows frames, the windows frame split and display module displays a tool list related to the first application program at the intersection.

According to an embodiment of the present invention, the windows frame split and display module moves the windows frames to display the tool list.

The present invention further provides a computer program product comprises at least one program instruction, wherein the program instructions are suitable for being loaded into an electronic device to execute following steps. First, a touch trajectory generated by continuously touching a touch panel of the electronic device is detected, wherein the center of the touch panel is a display area, and a non-display area surrounds the display area. Then, whether the touch trajectory is started from one side of the non-display area and passed through the display area to be extended to the other side of the non-display area is determined. If the touch trajectory is started from one side of the non-display area and passed through the display area to be extended to the other side of the non-display area, the display area is split according to the touch trajectory to display at least two windows frames.

The present invention provides an intuitional touch panel operation method which allows a user to split a display area to display multiple windows frames, so that the user can view contents of different windows frames at the same time. As a result, the operation of the electronic device is made very convenient.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

When a user operates an electronic device, it is very convenient to the user if a windows frame currently displayed in the screen of the electronic device can be split into multiple windows frames to display different contents. Accordingly, the present invention provides a method for generating multiple windows frames, an electronic device thereof, and a computer program product using the method. Below, embodiments of the present invention will be described in detail with reference to accompanying drawings.

Figure 1:
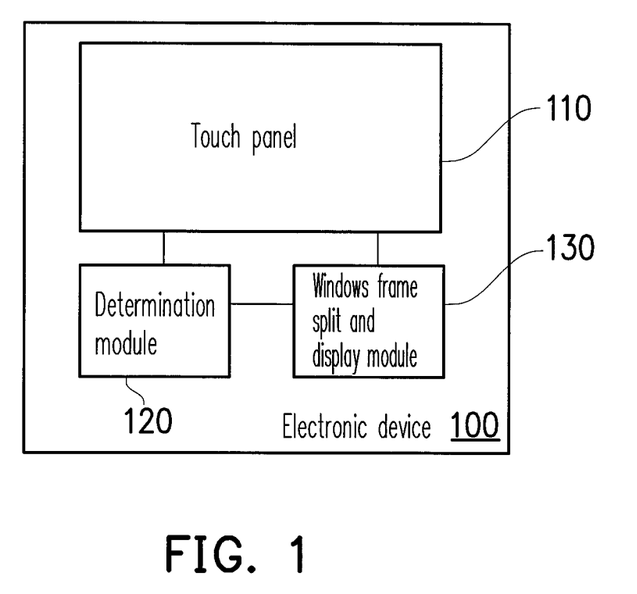
FIG. 1 is a block diagram of an electronic device according to an embodiment of the present invention.

FIG. 1 is a block diagram of an electronic device according to an embodiment of the present invention. Referring to FIG. 1, the electronic device 100 includes a touch panel 110, a determination module 120, and a windows frame split and display module 130. In the present embodiment, the electronic device 100 may be a cell phone, a personal digital assistant (PDA) phone, or a smartphone, etc. However, the scope of the electronic device 100 is not limited in the present invention.

Figure 2:
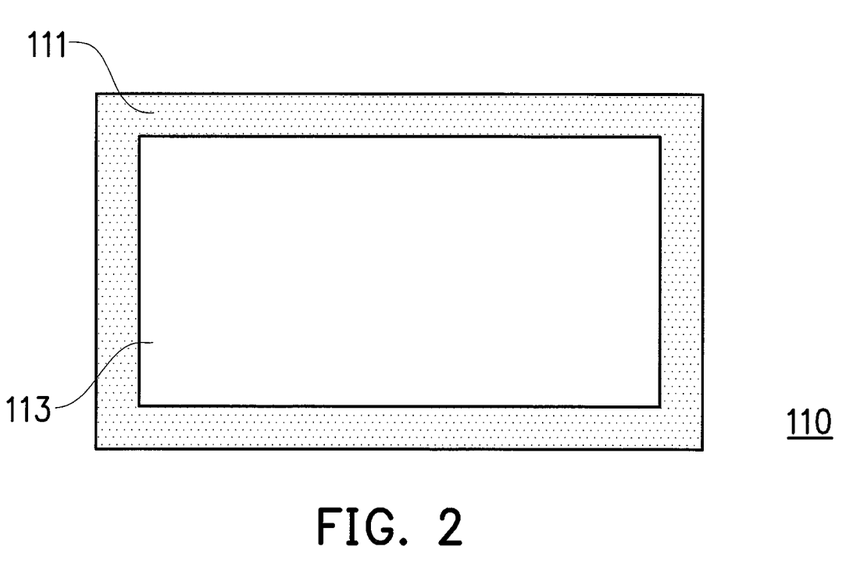
FIG. 2 and FIGS. 4A~4C are diagrams illustrating the appearance of a touch panel according to an embodiment of the present invention.

The touch panel 110 may be a resistive touch panel or a capacitive touch panel and which can detect a touch trajectory generated when a user continuously touches the touch panel 110 by using an input tool (for example, a finger or a stylus). In the present embodiment, the appearance of the touch panel 110 is as illustrated in FIG. 2. Referring to FIG. 2, the center of the touch panel 110 is a display area 113, and the area surrounds the display area 113 is a non-display area 111. The display area 113 is the screen of the electronic device 100 and which can be used for displaying operation windows frames of various application programs executed by the electronic device 100. The non-display area 111 cannot be used for display. However, both the display area 113 and the non-display area 111 can detect touch signals and corresponding touch trajectories generated by touch actions.

The determination module 120 is coupled to the touch panel 110, and after the touch panel 110 detects the touch trajectory, the determination module 120 determines whether the touch trajectory is started from one side of the non-display area 111 of the touch panel 110 and passed through the display area 113 to be extended to the other side of the non-display area 111. Namely, the determination module 120 can determine whether the action of the user by using the input tool is started from one side of the non-display area 111 and ended at the other side of the non-display area 111 by continuously running over the display area 113.

The windows frame split and display module 130 is coupled to the determination module 120 and the touch panel 110. The windows frame split and display module 130 obtains the determination result of the determination module 120, and when the determination module 120 determines that the touch trajectory is started from one side of the non-display area 111 of the touch panel 110 and passed through the display area 113 to be extended to the other side of the non-display area 111, the windows frame split and display module 130 splits the display area 113 according to the touch trajectory to display two or more windows frames.

Figure 3:
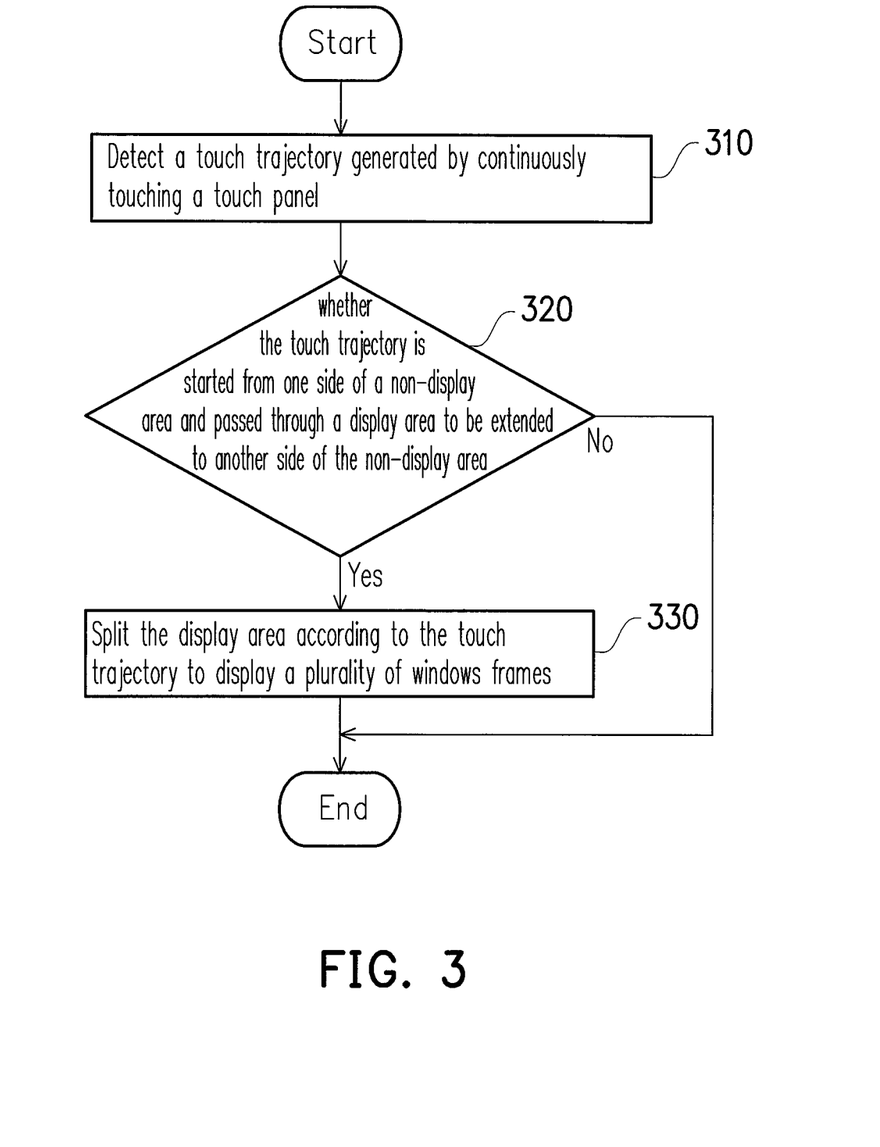
FIG. 3 is a flowchart of a method for generating multiple windows frames according to an embodiment of the present invention.

Through the operations of the determination module 120 and the windows frame split and display module 130, when the user draws a continuous trajectory on the touch panel 110 with the input tool from one side out of the display area 113 (i.e., the non-display area 111) to the other side out of the display area 113 by crossing over the display area 113, the display area 113 can be split into multiple windows frames. FIG. 3 is a flowchart of a method for generating multiple windows frames according to an embodiment of the present invention. In the present embodiment, how to generate multiple windows frames in the electronic device 100 will be described in detail.

Referring to FIGS. 1, 2, and 3, first, in step 310, a touch trajectory generated when a user continuously touches the touch panel 110 by using an input tool is detected through the touch panel 110, wherein the touch trajectory may be a continuous straight trajectory or a continuous curve trajectory; however, the scope of the touch trajectory is not limited herein.

Then, in step 320, the determination module 120 determines whether the touch trajectory is started from one side of the non-display area 111 and passed through the display area 113 to be extended to the other side of the non-display area 111. For example, assuming the touch trajectory is started from the upper side of the non-display area 111, then the determination module 120 determines whether the touch trajectory is passed through the display area 113 and ended at the lower side of the non-display area 111. Besides, the determination module 120 may also determine whether the touch trajectory is started from the lower side of the non-display area 111 and ended at the upper side of the same, started from the left side of the non-display area 111 and ended at the right side of the same, or started from the right side of the non-display area 111 and ended at the left side of the same, etc. To be specific, the starting point of the touch trajectory may fall at any side of the non-display area 111, and the determination module 120 may determine whether the touch trajectory is passed through the display area 113 and ended at the other side of the non-display area 111.

If the determination module 120 determines that the touch trajectory is started from one side of the non-display area 111 and passed through the display area 113 to be extended to the other side of the non-display area 111, in step 330, the windows frame split and display module 130 splits the display area 113 according to the touch trajectory to display at least two windows frames in the display area 113. Along with different start point and end point of the touch trajectory, the windows frame split and display module 130 splits the display area 113 differently. For example, if the touch trajectory is a horizontal line, the windows frame split and display module 130 splits the display area 113 horizontally. If the touch trajectory is a vertical line, the windows frame split and display module 130 splits the display area 113 vertically.

When the display area 113 is split into several blocks for displaying different windows frames, the displayed windows frames may be the windows frame previously displayed in the display area 113, windows frames containing contents related to the previously displayed windows frame (for example, corresponding to the same application program or corresponding to related application programs), or operation windows frames of application programs predetermined by the electronic device 100 or the user. However, the contents of these new windows frames are not limited herein.

However, it should be noted that the windows frame split and display module 130 splits the display area 113 according to the touch trajectory, and the number (i.e., the number of newly generated windows frames) and shapes of blocks generated after the display area 113 is split are related to the number of touch trajectories, the start points and end points of the touch trajectories, and the number of windows frames previously displayed in the display area 113.

In the embodiment described below, assuming that the display area 113 is used for displaying one windows frame before the windows frame split and display module 130 splits the display area 113 to display multiple windows frames, and this windows frame is a first operation windows frame (for example, a web browsing windows frame) of a first application program (for example, a browser application program) executed by the electronic device 100. For example, when the user runs his finger or a stylus from the upper portion of the non-display area 111 to the lower portion of the non-display area 111 by crossing the display area 113, the display area 113 is vertically split by the windows frame split and display module 130 into two blocks for respectively displaying two windows frames.

In an embodiment of the present invention, the two blocks generated by the windows frame split and display module 130 can be used for respectively displaying foregoing first operation windows frame (i.e., the web browsing windows frame) and a second operation windows frame (for example, a browser bookmark windows frame) related to the first application program (i.e., the browser application program). In another embodiment of the present invention, the two blocks can be used for displaying the first operation windows frame and a second operation windows frame of a second application program. The second application program may be an application program related to the first application program, an application program predetermined by the user, or an application program predetermined by the electronic device 100. However, the scope of the second application program is not limited herein.

In other words, when the user runs the input tool from one side of the non-display area 111 across the display area 113 to reach the other side of the non-display area 111, the display area 113 is split to display different windows frames, which gives the user a feeling that he splits the windows frame. The new windows frames may be any windows frames related to the previously displayed windows frame or windows frames related to a predetermined application program. For example, if the previously displayed windows frame is an operation windows frame for making phone call of a phonebook application program, the newly split windows frames may include a windows frame for displaying a contact list. If the previously displayed windows frame is an operation windows frame for displaying an inbox of an email application program, the newly split windows frames may include a windows frame for previewing emails. In addition, if the previously displayed windows frame is an operation windows frame for displaying a contact list of an instant messaging application program, the newly split windows frames may include a windows frame for displaying a conversation window.

Figure 4A:
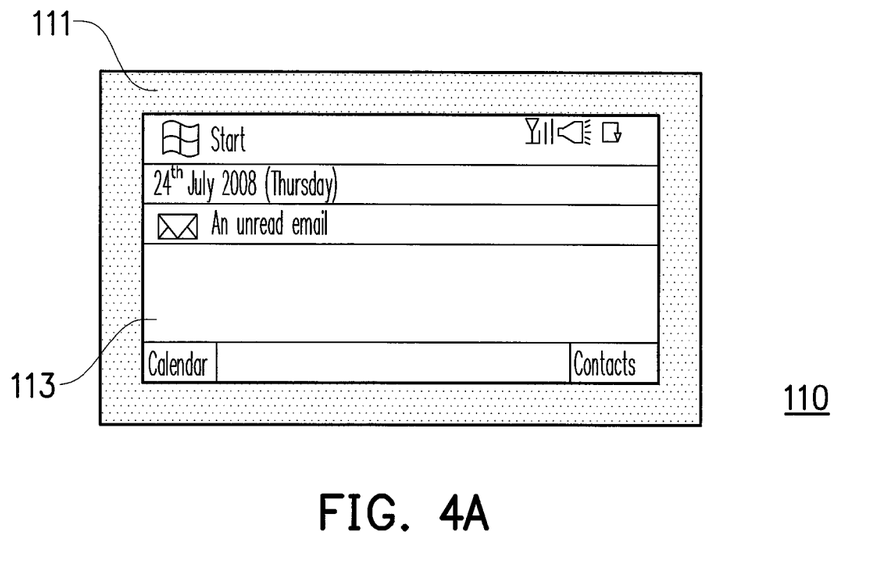
Figure 4B:
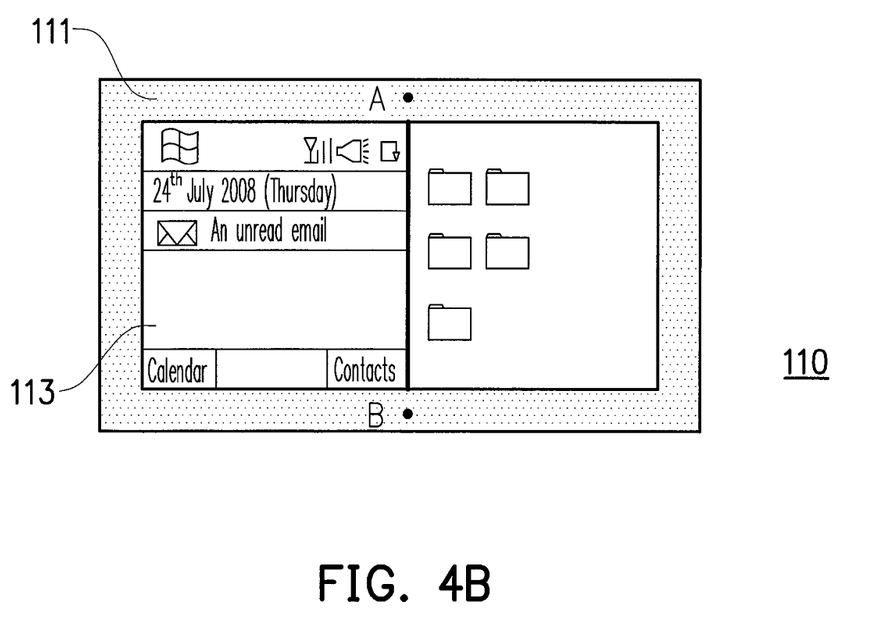
Figure 4C:
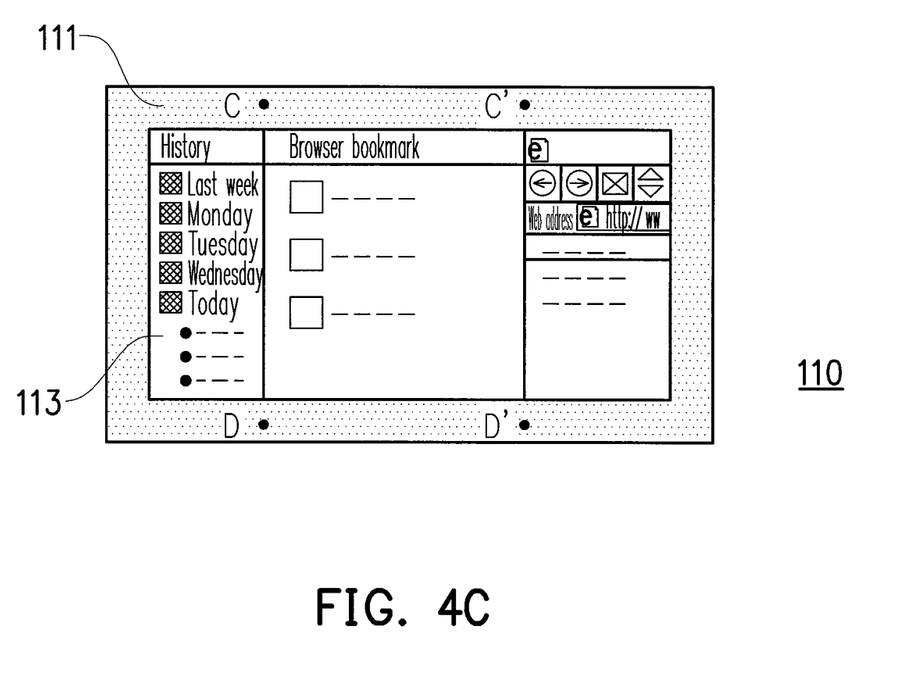

FIGS. 4A~4C are diagram illustrating the appearance of a touch panel according to an embodiment of the present invention. First, referring to FIG. 4A, a windows frame is displayed in the display area 113. Then, referring to FIG. 4B, when a user touches the upper side of the non-display area 111 with his finger and runs his finger over the display area 113 to reach the lower side of the non-display area 111 (i.e., to generate a touch trajectory from start point A to end point B), the display area 113 is split into two portions for respectively displaying different windows frames.

Referring to FIG. 4C, when the user touches the upper side of the non-display area 111 (for example, the start point C and the start point C') with two fingers and runs both fingers over the display area 113 to reach the lower side of the non-display area 111 (for example, the end point D and the end point D'), the display area 113 is split into three blocks by the windows frame split and display module 130 for displaying three windows frames at the same time. In other words, the windows frame split and display module 130 splits the display area to display n+1 windows frames when n touch trajectories are simultaneously generated, wherein n is a positive integer.

From the viewpoint of the user, the display area 113 can be split into multiple windows frames by simply performing a touch action for "cleaving" the touch panel 110. This method for generating multiple windows frames is very intuitional, and the display area can be instantly split when a user needs to view two or more windows frames at the same time. Thereby, the operation of the electronic device 100 is made very convenient.

In the embodiment described below, when the windows frame split and display module 130 decides to split the display area 113 to display multiple windows frames according to the determination result of the determination module 120, the windows frame split and display module 130 directly displays a tool list at the intersection between two of the windows frames to separate different windows frames. Assuming that the display area 113 is used for displaying an operation windows frame of an application program before the display area 113 is split, the tool list may be corresponding to this application program. Namely, the corresponding tool list is also displayed in the display area 113 at the same time when the user splits the windows frames.

In another embodiment of the present invention, after the windows frame split and display module 130 splits the display area 113 to display multiple windows frames, if the touch panel 110 detects a touch trajectory which overlaps the intersection between two of the windows frames, the windows frame split and display module 130 displays the tool list at this intersection. Namely, after the user splits the windows frames, the user can run the input tool over the intersection between the windows frames to call out the tool list.

It should be mentioned that the windows frame split and display module 130 can display the tool list by moving the windows frames. For example, assuming that two windows frames are currently displayed in the display area 113, when the user runs the input tool over the intersection between these two windows frames, the windows frames are moved respectively leftwards and rightwards to vacate a space for display the tool list. However, the windows frame split and display module 130 may also produce the space for displaying the tool list by reducing the sizes of the windows frames, and the method adopted for producing the space for displaying the tool list is not limited herein.

In the embodiment described above, after the touch panel 110 detects the touch trajectory, the determination module 120 determines whether the touch trajectory is started from one side of the non-display area 111 and passed through the display area 113 to be extended to the other side of the non-display area 111, and the windows frame split and display module 130 determines whether to split the display area 113 to display multiple windows frames according to foregoing determination result. However, in another embodiment of the present invention, the determination module 120 also determines whether the touch trajectory is started from one edge of the display area 113 and passed through the display area 113 to be extended to the other edge of the display area 113, and the windows frame split and display module 130 splits the display area 113 to display multiple windows frames according to the touch trajectory when the determination module 120 determines that the touch trajectory is started from one edge of the display area 113 and passed through the display area 113 to be extended to the other edge of the display area 113. In other words, when the user needs to view multiple windows frames at the same time therefore is about to split the display area, besides placing the input tool at one side of the non-display area 111 and running the input tool across the display area 113 to the other side of the non-display area 111, the user may also touch one edge of the display area 113 by using the input tool and moves the input tool across the display area 113 to the other edge of the display area 113. Foregoing two methods can both split the display area 113 to display multiple windows frames.

The present invention further provides a computer program product for executing foregoing method for generating multiple windows frames. The computer program product is composed of a plurality of program instructions (for example, a setting program instruction and a deployment program instruction) embodied therein. These program instructions can be loaded into an electronic device and executed by the same to execute the method for generating multiple windows frames and the functions of the electronic device described above.

In overview, the present invention provides a method for generating multiple windows frames, an electronic device thereof, and a computer program product using the method, wherein an intuitive and convenient method is provided to split a display area of a touch panel for displaying multiple windows frames is provided. When a user needs to view multiple windows frames at the same time, the user can runs an input tool over the touch panel to split the display area into multiple windows frames. Thereby, the operation of the electronic device is made very convenient, and it becomes more interesting to use this electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating multiple windows frames, suitable for an electronic device with a touch panel comprising a display area, the method comprising:
    displaying a first windows frame of a first application program in the display area;
    after the step of displaying the first windows frame, detecting a first touch signal;
    in response to detecting the first touch signal, displaying two windows frames appearing to be tiled according to the first touch signal,
    wherein the two windows frames comprise a second windows frame of a second application program; wherein the first application program and the second application program are different; wherein contents of the two windows frames are displayed at the same time;
    detecting a second touch signal when displaying two windows frames appearing to be tiled; and
    moving the two windows frames respectively toward a first direction and a second direction to vacate a space for displaying a tool list associated with the first application at the space which is at an intersection between the two windows frames and reducing the sizes of the two windows frames to produce the space for displaying the tool list at the space which is at the intersection between the two windows frames in response to detecting the second touch signal over the intersection between the two windows frames.

2. The method according to claim 1, wherein the displayed two windows frames comprise the first windows frame of the first application program.

3. An electronic device, comprising:
    a touch panel, for detecting a first touch signal, wherein the touch panel comprising a display area,
    wherein the display area is used for displaying a first windows frame of a first application program before the touch panel detects the first touch signal; and
    a windows frame split and display module, coupled to the touch panel, for displaying two windows frames appearing to be tiled in response to detecting the first touch signal,
    wherein the displayed two windows frames comprise a second windows frame of a second application program; wherein the first application program and the second application program are different, wherein contents of the two windows frames are displayed at the same time;
    wherein the touch panel detects a second touch signal when displaying two windows frames appearing to be tiled, and the windows frame split and display module moves the two windows frames respectively toward a first direction and a second direction to vacate a space for displaying a tool list associated with the first application at the space which is at an intersection between the two windows frames and reduces the sizes of the two windows frames to produce the space for displaying the tool list at the space which is at the intersection between the two windows frames in response to detecting the second touch signal over the intersection between the two windows frames.

4. The electronic device according to claim 3, wherein the displayed two windows frames comprises the first windows frame of the first application program.

5. An electronic device, comprising:
    a touch panel, for detecting a first touch signal, wherein the touch panel comprises a display area and the display area comprises a first windows frame; and
    a windows frame split and display module, coupled to the touch panel, for displaying two windows frames appearing to be tiled in response to detecting the first touch signal,
    wherein the two windows frames comprises a second windows frame, wherein a second content of the second windows frame is related to a first content of the first windows frame, and the types of first content and second content are different, wherein contents of the two windows frames are displayed at the same time;
    wherein the touch panel detects a second touch signal when displaying two windows frames appearing to be tiled, and the windows frame split and display module moves the two windows frames respectively toward a first direction and a second direction to vacate a space for displaying a tool list associated with the first content at the space which is at an intersection between the two windows frames and reduces the sizes of the two windows frames to produce the space for displaying the tool list at the space which is at the intersection between the two windows frames in response to detecting the second touch signal over the intersection between the two windows frames.

6. The electronic device according to claim 5, wherein the first windows frame belongs to a first application program, the second windows frame belongs to a second application program, the first application program and the second application program are the same.

7. The electronic device according to claim 5, wherein the first windows frame belongs to a first application program, the second windows frame belongs to a second application program, the first application program and the second application program are different.

8. The electronic device according to claim 5, wherein the second windows frame belongs to a second application program, the second application program is a predetermined application program.

9. The electronic device according to claim 5, wherein the first windows frame is an windows frame for making a phone call and the second windows frame comprises a contact list.

10. The electronic device according to claim 5, wherein the first windows frame is an windows frame for displaying an inbox of an email application program and the second windows frame comprises an email preview.

11. The electronic device according to claim 5, wherein the first windows frame is an windows frame for displaying a contact list of the instant messaging application program and the second windows frame comprises a conversation of the instant messaging application program.

12. The electronic device according to claim 5, wherein the first windows frame belongs to a first application program, the second windows frame belongs to a second application program, the tool list is related to the first application program.

* * * * *